United States Patent [19]

Fydelor et al.

[11] Patent Number: 4,785,059
[45] Date of Patent: Nov. 15, 1988

[54] PROCESS FOR THE PREPARATION OF A HYDROPHILIC WATER SWELLABLE GRAFT COPOLYMER

[75] Inventors: Peter J. Fydelor, Swindon; Ronald A. Miller, London; Barbara J. Ringrose, Swindon; Jonathan W. A. Ramsay, London, all of England

[73] Assignee: The Secretary of State for Defence in Her Brittanic Majesty's Government of the United Kingdom of Great Britain and Northern Ireland, London, England

[21] Appl. No.: 70,678

[22] Filed: Jul. 6, 1987

Related U.S. Application Data

[63] Continuation of Ser. No. 819,885, filed as PCT GB85/00197 on May 10, 1985, published as WO85/05364 on Dec. 5, 1985, abandoned.

[30] Foreign Application Priority Data

May 10, 1984 [GB] United Kingdom ............... 8412007

[51] Int. Cl.$^4$ .................. C08F 265/02; C08F 267/02
[52] U.S. Cl. .................................... 525/301; 525/369; 522/153
[58] Field of Search .................. 522/153; 525/60, 301, 525/369

[56] References Cited

U.S. PATENT DOCUMENTS 4,309,525  1/1982  Nakabayashi et al. ............... 525/60

FOREIGN PATENT DOCUMENTS 86159     8/1983   European Pat. Off. .
1451891  10/1976   United Kingdom .
1451892  10/1976   United Kingdom .

OTHER PUBLICATIONS

Chemical Abstracts, vol. 94, 2/81, No. 31745s, Japan Atomic Energy Research Institute.
Chemical Abstracts, vol. 86, 5/77, No. 122470z, Toyo Soda.

Primary Examiner—Paul R. Michl
Assistant Examiner—Patrick A. Doody
Attorney, Agent, or Firm—Cushman, Darby & Cushman

[57] ABSTRACT

A hydrophilic, water-swellable graft copolymer comprising polyethylene vinyl acetate (PEVA) containing between 8 and 30 wt. % vinyl acetate units, radiation graft copolymerized with an ethylenic carboxylic acid and subsequently heat treated in an aqueous hydroxide solution at a temperature greater than the softening point of the PEVA. A process for the preparation of such a polymer by radiation induced graft copolymerization of PEVA with an ethylenic carboxylic acid and subsequent heat treatment in an aqueous hydroxide solution at a temperature greater than the softening point of the PEVA is also described. The polymers of the invention are suitable for making into devices for various applications, but are particularly useful for making surgical devices, such as laparascope tubes, urethal catheters, endovascular cannuli, for endoscopic access, and as endo-prostheses. Some examples of surgical uses of such devices using the invention are described.

10 Claims, No Drawings

PROCESS FOR THE PREPARATION OF A HYDROPHILIC WATER SWELLABLE GRAFT COPOLYMER

This is a continuation of application Ser. No. 819,885 filed as PCT GB85/00197 on May 10, 1985, published as WO85/05364 on Dec. 5, 1985, which was abandoned upon the filing hereof.

The present invention relates to a hydrophilic, water-swellable graft copolymer and to surgical devices incorporating said graft copolymer.

Synthetic polymeric materials have been employed for a wide variety of surgical devices for many years. For example polyvinyl chlorides, polytetrafluoroethylene, polyamides, polyethylenes and silicone rubbers have been utilised as catheters and cannulae (for the introduction or draining of various fluids), as dilators and connectors as well as for implantation into or onto living mammalian bodies. Most of the devices and the materials from which they are made have performed their intended purpose at least adequately. In a number of cases however the availability of a material (for such surgical devices) that was capable of swelling to a high degree in aqueous media, whilst, in its hydrated form, retaining its integrity and exhibiting slippery surface characteristics, would greatly facilitate medical treatment.

A number of water-swellable materials are known which are suitable for medical applications, such as hydrophilic gels (hydrogels), some of which take up many hundreds of percent of their own weight of water but are generally slow to reach equilibrium and are quite weak on full hydration. Some are non-cyclable ie cannt be dried fully and then reswollen to their former dimensions. Some are unsuitable for tubular geometry in the swollen, weak state and unable to exert the required pressure for maintenance of lumen. On hydration hydrogels of tubular structure are likely to give rise to a decrease rather than an increase in internal diameter. Hydrogels therefore need to be coated or grafted to supports for strength. To allow the complete structure to swell however a bulk graft is required and the limitations on swelling are thus governed by the backbone polymer.

It is an object of the present invention to provide novel graft copolymers that meet these further requirements, whilst overcoming the difficulties encountered with known water swellable materials.

It is a further object of the present invention to provide devices incorporating these novel graft copolymers, particularly surgical devices.

According to a first aspect of the present invention a hydrophilic water-swellable graft copolymer comprises polyethylene vinyl acetate (PEVA), containing between 8 and 30 weight percent vinyl acetate units, radiation graft copolymerised with an ethylenic carboxylic acid and subsequently heat treated in an aqueous hydroxide solution at a temperature above the softening point of the PEVA.

According to a second aspect of the present invention there is provided a process for the preparation of a hydrophilic water-swellable graft copolymer comprising radiation graft copolymerising polyethylene vinyl acetate (PEVA) containing between 8 and 30 weight percent of vinyl acetate units, with an ethylenic carboxylic acid, and subsequently heat treating the graft copoymerised PEVA in an aqueous hydroxide solution at a temperature in excess of the softening point of the PEVA.

The terms 'polyethylene vinyl acetate' and 'PEVA' used herein refer to copolymers of ethylene and vinyl acetate. These may comprise purely ethylene and vinyl acetate units or may may comprise polymers consisting substantially of ethylene and vinyl acetate units together with small quantities of additives such as propylene which may be present in commercially available PEVA. PEVA is available commercially containing up to about 40 percent by weight of vinyl acetate units but the inventors have found that the upper limit to achieve workable strength in the polymers of the invention without crosslinking is 30% by weight.

The percentage of vinyl acetate units in the PEVA is one of the factors determining the crystallinity of the PEVA, and the inventors have noted that in the samples of PEVA presently available those containing 8 wt. % of vinyl acetate units generally are about 35 wt.% crystalline, the crystallinity decreasing with increasing vinyl acetate content.

The preferred ethylenic carboxylic acids are acrylic acid or an alkyl substituted acrylic acid, especially methacrylic acid.

In many cases the PEVA may be pre-formed in a desired shape, eg. sheet, tube, solid, prior to graft copolymerisation. However it is also possible for the graft copolymerised polymer to be formed as required, or even, in some embodiments of the present invention, for the heat treated polymer to be shaped, by, for example slowly drying the hydrated material over a former. Whichever method of shaping the material is chosen, the shape is retained on subsequent hydration of the heat treated material.

Furthermore in the great majority of cases the PEVA is uniformly graft copolymerised throughout the bulk of the polymer (bulk graft copolymerisation) or throughout selected parts of the bulk of the polymer (selective bulk graft copolymerisation). Surface graft copolymerised PEVA in which he polymer is graft copolymerised to a known depth from its surface on any one or more of its surfaces, may however have important though limited uses.

The graft copolymerisation reaction is preferably carried out in a suitable solvent for the ethylenic carboxylic acid, although, particularly where it is only necessary to carry out a surface graft copolymerisation, the reaction may be carried out in the absence of any solvent, ie in undiluted acid. The preferred solvent for the acid is water, however other solvents such as ethanol or acetone may be used without adverse effect on the product. Preferably the percentage of acid in the solvent is between 2 and 50 percent by volume. Chain transfer agents, free radical scavengers and/or homopolymerisation inhibiting agents of the type well known in the graft copolymerisation art may also be present during the graft copolymerisation.

In a preferred embodiment of the present material and process the graft copolymerisation takes place in an aqueous solution of an ethylenic carboxylic acid containin a homopolymerisation inhibitor selected from cupric chloride, cupric nitrate, certain organic inhibitors, or, which is particularly preferred, ferrous sulphate or potassium ferricyanide.

Initiation of the graft copolymerisation is preferably effected by ionising radiations, especially high energy gamma radiation, although othe radiations eg ultraviolet, light or heat may be used where appropriate. Where initiation is by ionising radiations such as gamma rays or accelerated electrons, the absorbed dose is preferably between $1 \times 10^5$ and $3 \times 10^6$ rad based upon a G Ferric ion for the Fricke Dosimeter of 15.6.

It is desirable to remove any dissolved gases such as air from the solution prior to the graft copolymerisation so as to avoid the formation of bubbles on the surface of the PEVA which might restrict access of the ethylenic carboxylic acid to the surface and result in non-uniform copolymerisation.

The percentage graft copolymerisation (percent weight of ethylenic carboxylic acid in total weight of product actually copolymerised, ie in surface graft copolymerised materials only the weight of the copolymerised regions is counted) is generally chosen so as to maximize the aqueous swelling characteristics of a given material according to the invention. The percentage is preferably between 20 and 60% by weight for both bulk and surface graft copolymerised materials.

Following graft-copolymerisation the graft copolymerised materials is separated from the rest of the reaction mixture and preferably washed in distilled water, and dried. The graft copolymerised material is then subjected to a heat treatment in an aqueous hydroxide solution at a temperature in excess of the softening point of the PEVA, and preferably in excess of 80° C. The preferred source of hydroxide ion is potassium hydroxide, whilst the hydroxide concentration in the heat treatment medium is preferably between 0.1M and 10M, especially between 0.1 and 0.5M. The most preferred heat treatment medium is a 0.5 to 1.5M aqueous solution of potassium hydroxide.

The heat treatment temperature must be above the softening point of the PEVA and is preferably above 80° C. The exact temperature of heat treatment however is determined by the particular properties (swelling, slipperiness for example) required of the final product. Similarly the time that the graft copolymerised PEVA is immersed in the heat treatment medium is determined by the properties required of the final product, as well as by the thickness of the material undergoing heat treatment and the medium used for the heat treatment. In the experience of the present inventors the time can be measured in minutes rather than hours. After heat treatment the medium is removed and the treated material is preferably washed with distilled water and dried. For best results this drying should be carried out slowly, especially at a temperature between 40° C. and 60° C., particularly of about 50° C.

The graft copolymers of the present invention swell to an equilibrium extent within a few minutes of wetting, and is generally fully cyclable. The sped of swelling may be reduced for example by restricting the access of water to the surface by for example coating the copolymer with a partially water resistant, or water-soluble layer, which may be a water soluble polymer.

According to a third aspect of the present invention there is provided a device made wholly or partly of a hydrophilic water swellable graft copolymer according to the present invention.

Such a device may be intended for any appropriate commercial or industrial use, and may have any geometry appropriate for such use. A particularly preferred form of such a device is a tube, which on wetting expands providing both an increased external diameter and an increased internal bore. Such a tube may have at least one closed end. Particular advantages may be achieved by making a device according to the invention in which parts of the device swell to different extents on wetting. Such differential swelling may for example comprise:

(i) The swelling of some parts whilst other parts do not swell. This may be achieved by selective bulk copolymerisation of only those parts of the device where swelling is required.

(ii) The swelling of different parts of the device to diferent extents. This may be achieved by varying the regime of the process of the invention in different parts of the device, for example some parts of the device may be subjected to a longer or hotter heat treatment.

(iii) Graded swelling. For example a smooth gradation of extent of swelling from non-swelling to swelling. This may for example be achieved by varying the regime of the process of the invention in different parts of the device in a graded manner.

The precise processing regime to achieve a desired differential extent of swelliing may be determined experimentally. Any device may include one or more of the types of differential swelling exemplified in (i) to (iii) above.

Particular advantages may also be achieved by introducing reinforcing elements into such a device, so as to further increase the strength of the device in either or both its dry or swollen states. Suitable reinforcements may be introduced for example by co-extrusion of the PEVA with other materials having greater strength or rigidity, or by the introduction of reinforcing fibres, filaments or wires into either the body of the device or into a suitable cavity in the device.

A device according to the invention may be coated as described above to reduce the speed of swelling.

The main use, as presently envisaged, of the copolymers of the present invention is in the medical field, where the combination of a high water-swelling characteristic, slipperiness and retention of integrity will be particularly advantageous.

Accordingly, in a fourth aspect of the present invention, there is provided a surgical device made wholly or partly from a hydrophilic, water-swellable graft copolymer according to the present invention.

The term 'surgical' as used herein is intended to include both human and veterinary surgery.

Smooth surface properties of medically used polymers are an accepted feature of enhanced biotolerance and resistance to encrustation. Scanning electron microscope examination of the surface properties of dry and water-swelled copolymers of the present invention have shown that the surface of the water-swelled copolymer compare favourably with the dry surface of pure medical grade polydimethylsilane, The cytotoxicity of PEVA was assessed by elution, overlay and direct contact methods using pure cell cultures of NRC lung fibroblasts. Preliminary reports suggested equivalent cytotoxicity of PEVA to medical grade latex. The hypertoxicity of the culture medium caused by the hydrophilicity of PEVA caused difficulty in the interpretation of these results; with refined techniques of culture and elution it is to be expected that PEVA would compare favourably with polydimethylsiloxane in terms of cytotoxicity.

The preferred compositiions of and processes of preparing the graft copolymers employed in the present surgical devices are the same as those set out above in the description of the graft copolymer and the process of preparing the same. As before the final shape of the graft copolymer (and in this case the surgical device)

may be attained prior to graft copolymerisation, after graft copolymerisation or after heat treatment.

Surgical devices according to the present invention may utilise either bulk, selective bulk or surface graft copolymerised materials as described above. Such devices may also have parts which swell to different extents, agaain as described above. They may also incorporate reinforcing elements as described above, but in this case the material(s) used for reinforcing should comply with body and bodily fluid contacting clinical regulations appropriate to their intended use.

In surgical applications particularly it may be advantageous to reduce the speed of swelling on wetting by the application of a coating as described above. For example, if a graft copolymer of the present invention were used in a urethral or ureteric catheter a short swelling time would be a disadvantage. It would be advantageous to retain the relative stiffness of the unhydrated structure for a sufficient time to enable correct positioning and adjustment of the structure before swelling commences with attendant loss of stiffness. To delay such swelling the structure may be coated with a layer of water soluble polymer, which would dissolve over a given period of time depending upon the thickness of coating, type of polymer used or the application of cross-linking processes, so delaying the time for the structure to contact the swelling medium. Examples of polymers which may be used as such coatings include polyvinyl alcohols (PVA), polyvinyl pyrrolidines, polyethylene glycols and mixtures thereof. Any such polymer coating should be sufficiently biotolerable for there intended use, and may be applied to the surface of the structure by any means well known in the art, eg dipping into a solution of the polymer followed by drying.

By using the graft copolymers of the present invention, surgical devices according to the invention may be expected to retain adequate structural strength in the wet swollen state for a tubular device up to around 100% internal diameter change, but the required strength will of course depend upon the intended use.

Examples of surgical devices which may advantageously employ the present graft copolymers include the following:

i. Tubes for the passage of laparascopes and similar viewing instruments into the peritoneal, retroperitoneal and mediastinal spaces.

ii. Tubes to form a track through which a foreign body can be extracted without damage to the tissue of the track wall.

iii. Urethral catheters which would be self-lubricating and would therefore not require the introduction of jelly prior to insertion.

iv. Endovascular cannuli. In this case a selective bulk graft copolymerised material would have a rigid (non-heat treated) end which would act as an external Luer fillting for connection to conventional equipment, and a water swellable (heat treated) end which would serve as the endovascular component. Thus a small cannula could be used for insertion (aiding the comfort of the patient) which would expand, after insertion to give a wide lumen, thereby enhancing maximim infusion rates.

v. Nephrostomy drain using a surface graft copolymerised material.

vi. Tubes for use in percutaneous surgical techniques, in particular percutaneous nephroscopy. The introduction of such tubes into body cavities in the shrunken dry state would be followed by hydration and expansion, thereby allowing access to the cavity from without. Using the present materials the passable of instruments into and out of the body cavities would be enhanced, which in turn would reduce the trauma associated with non-lubricated stiffer tubing. In this way access to for example the ureter (through the urethra) and to the kidneys would be facilitated.

vii. Devices for the dilation of strictures, for example urethral, ureteric, biliary and oesophagal. In this case a device would be inserted into the duct or passage in which the stricture occurs, and on contact with bodily fluids would exert peripheral pressure, dilating the stricture.

viii. Store chutes bridging the ureter to the urethra.

ix. Artificial ureters x. Parenteral feeding.

xi. Packing, support and filling in reconstructive surgery.

xii. Incontinence controlling devices.

xiii. Endotrachael tubes, especially in infants.

xiv. Nasogastric feeding tubes in infants and adults.

xv. All forms of endoscopic access.

xvi. Endoprostheses, such as endo-uro, -bliary, -neurological or -vascular. In this case insertion of an endoprosthesis made of a graft copolymer according to the present invention may provide an especial advantage in that its swelling and exertion of peripheral pressure may be utilised to allow the prosthesis to form a temporary or permanent bridge across a scissional, diseased or hereditary gap in the lumen concerned.

The present graft copolymers, processes for preparing them and devices, including surgical devices incorporating them will now be described by way of example only.

EXAMPLE 1

A 38 μm thick film of polyethylene vinyl acetate containing 12.5% (by weight) vinyl acetate and of approx 25% crystallinity (supplied by ICI under the code number 555) was interleaved with an absorbent material and placed in a glass tube. The tube was filled with an aqueous monomer solution comprising 25% by volume of commercial grade stabilised acrylic acid and 4 g/l $FeSO_4$ (Analar Grade). The tube and contents were evacuated by water pump for 1½ hrs to remove oxygen and then pressure equalised and sealed. The tube was irradiated with gamma rays from a 60 Co source at a dose rate of 0.011 Mr/hr to a total dose of 0.8 Mrad at 20° C. The graft-copolymerised film was washed in distilled water and dried at 50° C. The acrylic acid graft was homogenous and 31.5% (by weight). The graft-copolymer was then subjected to a heat-treatment consisting of 5 mins immersion in a 5% aqueous potassium hydroxide solution at a temperature of 95° C., followed by a quench in distilled water at 20° C., rinsing in distilled water and drying at 50° C. Dimensional changes on subsequent water equilibration were measured and summarized as follows:

| % Change | | | |
|---|---|---|---|
| Length | Breadth | Thickness | Weight |
| +48 | +46 | +40 | +239 |

EXAMPLE 2

An 85 μm thick polyethylene vinyl acetate film (supplied by ICI under the code number 24-03/51) containing 24% (by weight) vinyl acetate and with approximately 15% crystallinity, together with antibloc agents, was graft-copolymerised as described in Example 1 but with a dose rate of 0.015 Mr/hr to a total dose of 1 Mrad. This gave an homogenous acrylic acid graft of 34.6% (by weight). Subsequent heat treatment was in the manner of Example 1 and gave the dimensional changes on water equilibration as summarized below.

| % Change | | | |
| --- | --- | --- | --- |
| Length | Breadth | Thickness | Weight |
| +82 | +88 | +130 | +797 |

EXAMPLE 3

A 300 μm wall tubular structure of polyethylene vinyl acetate (supplied by ICI under the code number 539) containing 18% (by weight) vinyl acetate and with approximately 20% crystallinity was graft-copolymerised as described in Example 1. Total dose given was 0.96 Mrad at a dose rate of 0.015 Mr/hr. This gave an homogenous acrylic graft of 37.0% (by weight). Subsequent heat treatment as in Example 1 gave dimensional changes on water equilibration as given below.

| % Change | | |
| --- | --- | --- |
| Length | Internal Diameter | Weight |
| +62 | +80 | +377 |

EXAMPLE 4

An extruded tube (nominal internal diameter 5.5 mm and wall thickness 0.3 mm) of polyethylene vinyl acetate containing 12.5% (by weight) vinyl acetate (the PVA supplied by ICI under the code number 514) was placed in a glass vessel. The tube was then immersed in an aqueous solution of acrylic acid (25% by volume) and ferrous sulphate (4 g/l). The vessel and contents were then evacuated by water pump for 2 hrs to remove oxygen and then pressure equalised and sealed. The vessel was irradiated with gamma rays from a 60 Co source at a dose rate of 0.015 Mrad/hr to a total dose of 1 Mrad at 21° C. The graft copolymerised tube was washed with distilled water (to remove unreacted monomer or homopolymer) and then dried at 50° C. The graft weight was determined to be 39.7% (by weight). The graft copolymerised tube was then immersed for 5 mins in a 5% aqueous solution of potassium hydroxide at 95° C. This was followed by a quench in distilled water at 20° C., rinsing in distilled water and drying at 50° C. Dimensional changes on subsequent water equilibration were measured, and are summarized as follows:

| % Change | | | |
| --- | --- | --- | --- |
| Length | Wall Thickness | Internal Diameter | Weight |
| +53 | +68 | +43 | +228 |

EXAMPLE 5

The procedure of Example 1 was repeated except that the potassium hydroxide solution was replaced by a 1M aqueous solution of sodium hydroxide.

EXAMPLE 6

The procedure of Example 1 was repeated except that the ferrous sulphate was replaced by 7 g/l of potassium ferricyanide and the concentrwtion of the potassium hydroxide solution was 1.5M.

EXAMPLE 7

The procedure of Example 1 was repeated except that the concentration of acrylic acid in the grafting solution was reduced to 12.5% (by volume) and the total dose of gamma radiation was increased to 1.2 Mrad.

EXAMPLE 8

The procedure of Example 5 was repeated except that the concentration of acrylic acid in the grafting solution was reduced to 12.5% (by volume) and the total dose of gamma radiation was increased to 1 Mrad.

EXAMPLE 9 (COMPARATIVE)

A 38 μm low density polyethylene with a 45% crystallinity was subjected to the graft copolymerisation and heat treatment described in Example 1. Dimensional changes on subsequent water equilibration were measured and are summarized as follows:

| % Change | | |
| --- | --- | --- |
| Length | Breadth | Weight |
| +10% | +25% | +75% |

EXAMPLE 10

(Comparative)

A 38 μm thick film of polyethylene vinyl acetate containing 4% (by weight) vinyl acetate and of approx 45% (by weight) crystallinity was treated as described in Example 1. Dimensional changes on subsequenyt water equilibration were measured and are summarized as follows:

| Length | Breadth | Weight |
| --- | --- | --- |
| +31% | +18% | +94% |

EXAMPLE 11

The graft copolymerised, heat treated tube of Example 4 was used to remove a calculus from the left posterior lower calyx of a man suffering from renal colic.

On the day of admission, a 26 Ch (Ch=Charier=approx 0.33 mm) nephrostomy track was dilated in a single session under neurolept anaesthesia using a Lundaquist guide wire and serial Cook fascial dilators. A 26 Ch Porges whistle tip nephrostomy tube was then left in situ for 4 days. The track was sighted through the lower calyx and X-rays showed that it was placed adjacent to the stone. On the 4th day, in the X-ray Department, with the patient on a Siemens (Trade Mark) uniplanar fluoroscopic table and under inhalational general anaesthetic, track endoscopy was carried out.

A floppy J guide wire was passed down the nephrostomy tube which was subsequently removed. Using a Thackray nephroscope with a preshrunk attached graft-copolymer tube (prepared as in Example 4) over its outer circumference the nephrocutaneous track was negotiated under direct vision using the wire guide as a directional aid. Following wetting of the graft-copolymer with saline, expansion occurred and the track was subsequently secured. The stone was visualised and siezed with alligator forceps and pulled through the tubing. The tube was then removed and the patient returned to the ward.

Post operatively urography creatinine clearance and urine cultures were all normal. The patient returned home 48 hours after the procedure and was well on follow up at one month's time.

EXAMPLE 12

The graft copolymerised, heat treated tube of Example 4 was used to remove a calculus from the left renal pelvis of a man suffering from recurrent urinary track infections and left loin pain.

Track dilatation was carried out under neurolept anaesthesia in the manner described in Example 11. On day 4, stone extraction was performed with the patient in the prone oblique position.

A soft J guide wire was passed down the Porges whistle tip nephrostomy tube and this was then removed. A 25 Ch Cook fascial dilator, which had previously been perforated and onto which the graft-copolymer tube (prepared as in Example 4) had been shrunken, was then passed over the guide wire into the kidney. Saline was poured into the central lumen of the dilator and this caused the tube to expand. The nephrocutaneous track was thus protected and the dilator removed from the middle of the tubing leaving a track directly between the skin and the kidney. A nephroscope (Thackray) was passed into the kidney and the stone identified. Using the Wolf ultrasonic lithotriptor, on setting 3, the stone was reduced to fragments over a period of an hour. These were extracted through the tube with alligator forceps under direct vision. After the successful conclusion of the operation the tube was removed and the patient returned to the ward.

He was able to return home on the 2nd post operative day, no ill effects were noted and urine cultures were sterile. He was well at follow up at one month's time.

The expansion tubing prepared as in Example 4 has the ability to stretch in the hydrated form and so allow the passage of calculi larger than the internal diameter of the established track. This would not be possible with currently available rigid tubing.

EXAMPLE 13

Example of tubular structure coated to decrease the swelling speed. A tubular structure as described in Example 3 above was coated with polyvinyl alcohol by dip coating with a 15 wt.% aqueous solution of polyvinyl alcohol of molecular weight 14,000 followed by drying at 50° C. The time to reach equilibrium swelling in water was increased to about 30 minutes compared with about 3 minutes for the uncoated tube.

EXAMPLE 14

A tubular structure of 1 mm internal diameter and 300 μm wall thickness of polyethylene vinyl acetate (supplied by ICI under the code number 554) containing 12.5% by weight of vinyl acetate was graft copolymerised and heat treated as described in example 4. Total dose given was 1 Mrad at a dose rate of 0.015 Mrad/hr to give a graft of 38.5% by weight. Dimensional changes on water equilibration were:

| | % Change | | |
|---|---|---|---|
| Length | Internal Diameter | Wall Thickness | Weight |
| +45 | +43 | +68 | +257 |

EXAMPLE 15

Tubes (stents) coated with polyvinyl alcohol prepared as described in Example 13 were implanted into the left ureter of 12 minipigs. The right ureter was used as a control. Currently used stents of medical graft polymers were implanted into the left ureter of a further 16 minipigs (8 polyurethane stents and 8 pure polydimethylsiloxane stents). The histological appearance of the uretic epithelium was assessed after contact with each polymer for periods of 1 week, 2 weeks, 2 months and 3 months. In all cases there was a tendency to mucous dysplasia in the transitional cell epithelium. This change was comparable in all groups.

EXAMPLE 16

The rabbit urinary track, in which calcium carbonate crystallises on all non-degradable biomaterials within one week of implantation, was chosen to compare the rate and degree of encrustation on stents of polydimethylsiloxane (3) polyvinylchloride (6) polyamide (3) and a copolymer according to the invention (3). The results are shown below. The copolymer compared favourably with polydimethylsiloxane. The stents were analysed by X-ray energy spectroscopy and the composition of the encrustations was checked by infra red analysis.

EXAMPLE 17

Tubes coated with polyvinyl alcohol as described in Example 13 were used as urethral catheters in 6 minipigs and were indwelling for a period of 2 weeks. Mucosal inflammatory changes were comparable to those reported in clinical studies in which accepted biomaterials have been composed. None of these tubes showed macroscopic signs of encrustation.

EXAMPLE 18

Of 34 implantation studies reported in minipigs positive bacteriological cultures were present in 2 animals 2 months after implantation. One of these animals had a polyurethane stent in situ, and the other had a stent made of tubing as described in example 13. The combination of urinary infection and a stent did not produce any increase in epithelial changes. It thus does not seem that PEVA implanted in the urinary tract produces an increased likelihood of urinary infection. Urinary tract infection was not detected in the studies using rabbits.

CONCLUSION

The experimental studies above, using tubes made of a graft copolymer according to the invention as indwelling ureteric and urethral prostheses suggest that PEVA copolymerised using the invention compares favourably with the most biotolerant medical polymers for urological use.

Incidence of encrustation on rabbit urinary tract implants removed at one month (Example 16)

| Animals | Implants | Urinary pH | Analysis XES | IR |
|---|---|---|---|---|
| 29 | Silicone | 8.0 | Ca | CaCO$_3$ |
| 38 | — | 7.5 | Ca | CaCO$_3$ |
| 42 | — | 7.0 | Ca | CaCO$_3$ |
| 4 | PVC | 8.0 | Ca | CaCO$_3$ |
| 39 | — | 8.5 | Ca | CaCO$_3$ |
| 41 | — | 8.0 | Ca | CaCO$_3$ |
| 34 | PVC | 8.0 | Ca | CaCO$_3$ |
| 49 | — | 7.5 | Ca | CaCO$_3$ |
| 50 | — | 8.0 | Ca | CaCO$_3$ |
| 35 | Nylon | 7.5 | Ca | CaCO$_3$ |
| 36 | — | 8.0 | Ca | CaCO$_3$ |
| 37 | — | 8.5 | Ca, Mg | CaCO$_3$ |
| 19 | PEVA | 8.0 | K | — |
| 45 | Copolymer | 7.5 | Ca, K | CaCO$_3$ |
| 44 | | 7.5 | Al, Ca, K | CaCO$_3$ |

We claim:

1. A process for the preparation of a hydrophilic water swellable graft copolymer, said copolymer being in the form of or capable of being formed into a solid device, comprising the steps of:
    (a) radiation graft copolymerising a polyethylene vinyl acetate polymer (PEVA) having between 8 and 30% by weight of vinyl acetate units, with an ethylenic carboxylic acid; and
    (b) subsequently heat treating the graft copolymerised PEVA in an aqueous hydroxide solution at a temperature in excess of the softening point of the PEVA.

2. A process as claimed in claim 1 wherein the ethylenic carboxylic acid is acrylic acid or an alkyl substituted acrylic acid.

3. A process as claimed in claim 2 wherein the ethylenic carboxylic acid is methacrylic acid.

4. A process as claimed in any one of claims 1 to 3 wherein the radiation graft copolymerisation is carried out in a solvent for the ethylenic carboxylic acid containing between 2% and 50% by volume of the ethylenic carboxylic acid.

5. A process as claimed in any one of claims 1 to 3 wherein the radiation graft copolymerisation is carried out using undiluted ethylenic carboxylic acid.

6. A process as claimed in claim 1 wherein the concentration of the hydroxide solution is between 0.1 and 10M.

7. A process as claimed in claim 6 wherein the concentration of the hydroxide solution is between 0.5 and 1.5M.

8. A process as claimed in claim 1 wherein the hydroxide is potassium hydroxide.

9. A process as claimed in claim 1 wherein said solid device is a surgical device.

10. A process as claimed in claim 1 wherein the level of grafting with the ethylenic carboxylic acid is between 20 to 60 wt%.

* * * * *